United States Patent Office

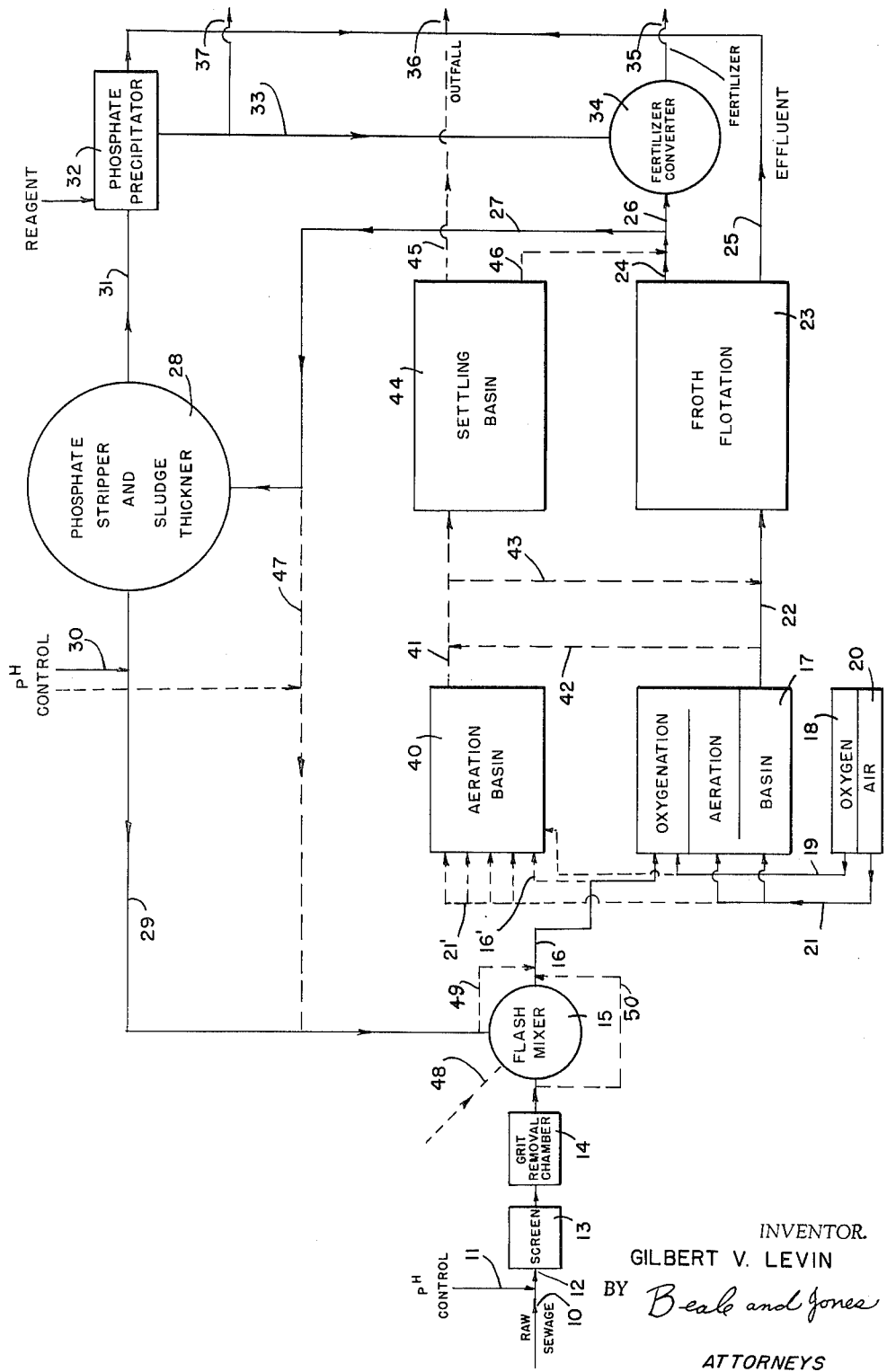

3,236,766
Patented Feb. 22, 1966

3,236,766
SEWAGE TREATMENT PROCESS
Gilbert V. Levin, North Chevy Chase, Md., assignor to Hazleton Laboratories, Incorporated, Falls Church, Va., a corporation of Virginia
Filed Mar. 31, 1964, Ser. No. 356,303
9 Claims. (Cl. 210—6)

The present invention relates to a process for treating raw or treated sewage to obtain an effluent that is substantially free of phosphate. The invention also contemplates recovery of high phosphate content sludge.

In the activated sludge processes in use today, the sewage, after the usual bar screen, grit chamber and preliminary sedimentation procedures, is treated in aeration basins to develop suspended masses of bacteria and protozoa. The sewage is discharged from the aeration basin into a secondary sedimentation basin. Here a portion of the biologically active sludge which has developed is collected and returned to the influent. The amount of return sludge is generally 10–30% of the total influent of raw sewage. In contact with the return sludge, the sewage is rapidly assimilated with concomitant reduction in the BOD content. This type of process, however, does not remove undesirable, dissolved, mineral constituents.

The foregoing type of biological oxidation process liberates the mineral constituents of organic matter. Large quantities of the dissolved minerals are discharged daily in sewage effluent to cause pollution of lakes, streams and estuaries. The undissolved minerals are believed to cause fertilization of the receiving waters and promote undesirable blooms in aquatic vegetation, particularly unicellular algae. Such blooms are unsightly, produce obnoxious odors on decaying, prevent recreational use of the water, may be toxic to aquatic life, wild life and domestic animals, and otherwise generally result in esthetic degradation as serious as might have been caused by the direct discharge of raw sewage into the lakes, streams and estuaries. Thus, sewage treatment processes to date have not been designed to reduce the quantities of dissolved materials in discharge effluents, but have been designed to remove suspended solids and increase BOD reduction. As a result, the paradox is realized in that strenuous efforts to prevent pollution of one type have produced an equally objectional pollution of a different character. Most frequently, as a result of conventional sewage treatment, sewage effluent contains more dissolved phosphate than the raw sewage influent. This is because the process liberates organically bound phosphorous contained in sewage particulates.

Investigations have shown that nitrogen and phosphorous are especially important in the growth of algae and in the production of blooms. Of the two, it has been determined that the available phosphorous is the ultimate limiting fact in the development of such blooms. It has also been determined that biochemical considerations indicate that the form in which phosphorous can be utilized directly by living organisms is as dissolved, inorganic orthophosphate.

While it has been recognized that the increased use of phosphate-containing fertilizers and detergents poses a serious threat to the pollution of domestic water, no economically feasible process has been developed to date to eliminate or reduce the quantity of dissolved phosphates contained in sewage effluent. Various attempts to remove the phosphate from sewage have been tried but without commercial success. For instance, tertiary treatment for phosphate reduction has been attempted. However, such processes depended upon the application of chemicals, such as ferric chloride to reduce the phosphate content. However, the overall cost of chemicals of this nature and the additional plant facilities required are prohibitive.

In view of the factors influencing receiving water pollution, the present invention overcomes the foregoing controlling factors by accomplishing the following objects:

The primary object of this invention is to remove the dissolved inorganic orthophosphate contained in raw or treated sewage.

Another object of the invention is to produce sludge containing microorganisms which when combined with the raw or treated sewage causes the microorganisms to react and take up the dissolved phosphate contained therein.

Another object of the invention is to maintain a rate of aeration sufficient to promote a high degree of phosphate uptake and BOD reduction.

Another object of the invention is to increase the phosphate capacity of microorganisms by removing the intracellular phosphate.

Another object of the invention is to substantially improve mixing to obtain improved sewage-sludge mixture.

Another object of the invention is to obtain both organic and inorganic fertilizers containing higher phosphate contents than are obtained by present methods.

Other objects, together with the foregoing, are obtained in the process described in the accompanying description and illustrated by the accompanying schematic drawing.

The foregoing described disadvantages are avoided and the objects accomplished by the practice of this invention, which briefly, comprises treating raw or treated sewage to obtain an effluent that is substantially free of dissolved phosphates and a sludge having a high phosphate content. According to the practice of this invention, the process comprises adjusting the pH of raw sewage, if necessary, to maintain a range of from about 6.2 to about 8.5, mixing the raw or treated sewage with sludge to form a mixed liquor, introducing and dissolving oxygen into the mixed liquor to maintain a dissolved oxygen content of at least about 0.3 mg. per liter in the mixed liquor, recovering phosphate-enriched sludge from the mixed liquor and producing a substantially phosphate-free effluent.

Treated sewage is intended to include the effluent from primary or secondary settling basins, trickling filters, high-rate aeration or activated sludge processes, contact aeration, sand filter and other like sewage treatment processes.

The invention is illustrated in the accompanying drawing wherein the figure is a schematic flow-sheet illustrating the preferred process as well as a number of various modified processes which may be practiced within the scope and spirit of the invention. Referring thereto, it will be seen that the preferred process is schematically shown by the solid lines whereas the modified variations are indicated by broken lines.

On entering the sewage treatment plant, the sewage 10 is continuously monitored for pH and adjusted as required at 11 to maintain a range from about 6.5 to about 8.5 with suitable chemicals, such as hydrochloric acid or sodium hydroxide, any inexpensive alkali or acid being preferred. The sewage 12 is then passed through conventional screening and grit removing units 13 and 14 and thence into mixing chamber 15. In the mixing unit 15, the raw sewage and return sludge are mixed with violent agitation until a homogeneous mixed liquor is produced. Complete mixing of the sludge and the sewage is desired for maximum efficiency of the overall sewage treatment process. It has been noted that conventional activated sludge and high-rate aeration treatment plants are deficient in this respect. A conventional flash mixer may be used to insure immediate and maximum dispersal of the sludge particles in the raw sewage.

The preliminary settling basin, as used in prior art processes, is eliminated at this point to prevent reduction in particulate carbohydrates delivered to the aeration basin. A portion of the carbohydrates are thereby allowed to hydrolyze and induce an additional uptake of dissolved orthophosphate. As an additional feature, it has been found that the elimination of the primary settling basin increases the BOD reduction.

The mixed liquor 16 from the mixer 15 is then introduced into a two-stage oxygenation-aeration basin 17. Oxygen is supplied by line 19 from the liquid oxygen plant 18, to the first section of the basin. The mixed liquor is oxygenated in the first section at a rate sufficient to maintain at least about 0.3 mg. of dissolved oxygen per liter of mixed liquor for a period of at least ten minutes. The preferred dissolved oxygen content of the mixed liquor is 0.5 mg. per liter throughout the basin, though it may be maintained at from about 0.5 mg. to about 2.0 mg. per liter. The oxygenated mixed liquor is then introduced into the aeration section of the basin where air is administered at a rate sufficient to maintain this dissolved oxygen level for a period of at least one and one-half hours. The air is supplied by lines 21 from source 20. Aeration figures cited herein are referenced to standard conditions. The oxygen level in both sections of the basin may be controlled by a feedback mechanism operating through a series of dissolved oxygen electrodes distributed throughout the basins. The upper limits of oxygenation and aeration being based merely on the economics of the operation.

The prime feature of the invention at this point resides in a "threshold" level of dissolved oxygen which is to be maintained at about at least 0.3 mg. per liter in the mixed liquor throughout the basin. Thus it has been discovered there exists a "threshold" level which results in the so-called "luxury" uptake of orthophosphate in the sludge. This "luxury" uptake of phosphate is important in that it demonstrates that organisms can take up phosphate in excess of their growth rate. And, unless aerobic conditions are maintained at about the "threshold" level, substantial leakage of the orthophosphate from the sludge will occur.

The treated effluent mixed liquor 22 is fed into a froth flotation unit 23 where the harvested sludge 24 is removed. This sludge contains a substantial portion of the phosphate present in the sewage. The clarified waste 25 is discharged to the effluent outfall 36. The harvested sludge 24 is divided into two portions 26 and 27, one for return sludge 27 and the other for wasting 26. The wasted sludge is converted at 34 into a fertilizer having a considerably higher phosphate content than is now obtained from conventional sewage treatment plants. This waste sludge 26 may be flash incinerated to obtain an inorganic fertilizer or flash dried to recover an organic fertilizer.

The return sludge 27, in an amount equivalent to the solids in a 10 to 50% return sludge mixture is delivered to the combination phosphate stripper and sludge thickener 28. Here the pH is adjusted to less than 6.5 while the sludge is maintained in a non-aerated or anaerobic condition for about 10 to 20 minutes. The anaerobic condition and acidic pH induce considerable quantities of intracellular phosphate to leak out of the sludge into a liquid phase. In order to increase the rate of leakage, the return sludge stream 27 may be subjected to anaerobic conditions while being transported to the stripper and sludge thickener. The return sludge is permitted to thicken and settle under slow mechanical stirring. A phosphate enriched supernatant liquor is produced and withdrawn at 31 from the stripper and allowed to flow into a phosphate precipitator 32. Alkali, such as lime, is mixed with the phosphate to precipitate tricalcium phosphate. The phosphate precipitate 33 may then be combined with the wasted sludge 26 and converted into an enriched fertilizer. However, the precipitated phosphate may be separately collected at 37.

The phosphate-depleted effluent from the precipitator 32 is combined with the effluent 25 from the flotation unit 23 for discharge to the outfall stream. The phosphate-depleted sludge produced in the stripper-thickener 28 is re-aerated, the pH adjusted at 30 to within a range from about 7 to about 8.5 and introduced by way of line 29 into the flash mixer 15 to be mixed with raw sewage influent. Instead of stripping all the return sludge of a substantial portion of the dissolved phosphates, the sludge 27 may either be completely recycled at 47 or divided and a portion 47 fed into the return stream 29 for re-introduction into the mixer 15.

If desired, sludge from an outside source 48 may be introduced into the mixer. However, normally this does not appear to be commercially feasible.

If desired, re-aeration and pH adjustment of the return sludge 27 need not be performed. However, such sludge would necessarily require re-aeration upon reaching the oxygenation-aeration basin 17 after being mixed with the raw sewage influent.

As will be readily apparent to one skilled in the art, the construction cost of new sewage disposal facilities is greatly reduced because of the elimination of the primary and secondary sedimentation basins and the entire sludge digestion system. Additionally, the costly tertiary treatment processes now contemplated to reduce the dissolved phosphates may likewise be eliminated.

While the foregoing disclosed process requires construction of new facilities, conversion of existing facilities has been anticipated. Referring to the drawing, the alternative processes for use with existing equipment are illustrated in the schematic drawing by broken lines.

The mixed liquor 16 may be directly introduced at 16' into an aeration basin 40 wherein the mixed liquor is aerated for a least two hours at a rate sufficient to maintained at least about 0.3 mg. of dissolved oxygen per liter of mixed liquor. Aeration basin 40 may or may not contain baffles to control mixed liquor flow. The air may be supplied to the aeration basin by lines 21' from source 20. Again it will be noted that the preliminary sedimentation procedures are eliminated. The treated liquor is removed at 41 and alternatively fed by line 43 to a froth flotation unit 23 such as in the prior embodiment or to an existing settling basin 44. Alternatively, the liquor from the oxygenation-aeration basin 17 may be supplied by line 42 to the settling basin 44. In the settling basin 44 the mixer liquor is allowed to separate into respective effluent and sludge components. The increased aeration which induces the phosphate uptake also improves the settling characteristics of the sludge. The effluent 45 is removed and discharged to the outfall. The sludge 46 is then divided into two components 26 and 27 and processed according to the procedure as hereinbefore described.

While complete mixing is of primary importance, the mixing may be carried out in the aeration and oxygenation basins by mechanical mixing or over areation. Thus the flash mixer 15 may be by-passed by lines 49 or 50.

The following examples illustrate specific embodiments of the present invention.

*Example 1*

Domestic, raw sewage is continuously monitored for pH as it enters the sewage treatment plant. The pH is adjusted with hydrochloric acid or sodium hydroxide as required to maintain the range of 7–8. The sewage is then passed through conventional screening and grit removal units to remove large floating and entrained objects. On leaving the grit removal chamber the raw sewage is fed into a flash mixer together with a 30% return sludge mixture. A conventional flash mixer is used to insure immediate and maximum dispersal of the sludge particles. The resulting mixed liquor from the flash mixer is fed into a two-stage oxygenation-aeration basin. Pure oxygen is supplied to the first stage at a rate of from 0.3.–0.5 ml./sec./liter for a detention period of about 15 minutes. Aeration is administered in the second stage at a rate of between 3 and 10 ml./sec./liter for a detention period of from 1¼ to 6 hours. The dissolved oxygen content in the basin is thus maintained at approximately the preferred level of 0.5 mg./liter throughout the basin. To insure the maintenance of the dissolved oxygen content in both sections of the basin, dissolved oxygen electrodes are distributed throughout the basin.

The effluent mixed liquor from the basin is fed into a froth flotation unit where the sludge is harvested. The clarified waste liquid is discharged to the effluent outfall after chlorination. The harvested sludge is divided into two portions, one for recycle and the other portion for conversion into fertilizer by flash incineration.

The return sludge, in an amount equivalent to the solids in a 30% return sludge mixture, is delivered under anaerobic conditions to the combination phosphate stripper and sludge thickener. While in the stripper, the pH is adjusted to between 5.0 and 6.0 and maintained at this level for 10 to 20 minutes. The conditions existing in the stripper induce considerable quantities of intracellular phosphate to leak out into the liquid phase. The sludge is permitted to thicken and settle under slow mechanical stirring. The thickened sludge is removed from the stripper, the pH adjusted to between 7 and 8 with lime and return to the flash mixer through a re-aeration conduit in which the thickened sludge is vigorously aerated en route.

The phosphate-enriched supernatant liquor formed in the stripper is withdrawn and fed into a chemical precipitation basin where lime is added and mixed to form a tricalcium phosphate precipitate which is permitted to settle. The precipitated tricalcium phosphate is transported to the flash incinerator and added to the already phosphate-enriched waste sludge previously supplied to the incinerator. From the chemical precipitation basin, the phosphate-depleted effluent joins the effluent from the aeration basin and may be chlorinated prior to discharge. Tests performed on the outfall effluent revealed that about 80% of the dissolved phosphate had been removed.

*Example 2*

The process of Example 1 is repeated with the sole exception that aeration alone is substituted for the oxygenation-aeration system.

The mixed liquor from the flash mixer is fed into an aeration basin. Air is supplied to the basin at a rate of 3.0 to 10 ml./sec./liter for a period of from 1½ to 6 hours. This rate is sufficient to maintain a dissolved oxygen content at approximately 0.5 mg./liter throughout the basin. The treated mixed liquor is withdrawn from the basin and further processed as in Example 1.

*Example 3*

The process of Example 1 is repeated with the sole exception that oxygen alone is substituted for the oxygenation-aeration system.

The mixed liquor from the flash mixer is fed into an oxygenation basin. Pure oxygen is supplied to the basin at a rate of 0.3–0.5 ml./sec./liter for a period of approximately one hour to obtain and maintain a dissolved oxygen content of approximately 0.5 mg./liter throughout the basin. The treated mixed liquor is withdrawn from the basin and further processed as in Example 1.

*Example 4*

The processes of Examples 1–3 are repeated with the exception that the influent is obtained from conventional sewage treatment facilities. Normally, the effluent from such treated sewage processes contains a high dissolved phosphate content which is substantially removed according to the practice of this invention.

I claim:
1. A process for treating a sewage material selected from the group consisting of raw sewage and treated sewage to obtain a sludge and a substantially phosphate-free effluent which comprises:
(A) mixing an influent of said sewage material with a sludge to form a mixed liquor,
(B) introducing an oxygen-containing gas into said mixed liquor until the dissolved oxygen content of said liquor is at least about 0.3 mg. per liter of said mixed liquor,
(C) separating sludge from said mixed liquor while the dissolved oxygen content thereof is at least about 3.0 mg. per liter of said mixed liquor to provide a substantially phosphate-free effluent,
(D) maintaining said separated sludge under anaerobic conditions to reduce the phosphate content of said separated sludge and to provide a phosphate-enriched supernatant liquor,
(E) separating said phosphate-enriched supernatant liquor and recovering said last named sludge having a reduced phosphate content and
(F) recycling said recovered last named sludge to provide sludge for mixing with said influent sewage material.

2. The process of claim 1 wherein the dissolved oxygen content of said mixed liquor is maintained at from 0.5 mg. to about 2.0 mg. per liter thereof until said sludge is separated therefrom to provide said substantially phosphate-free effluent.

3. The process of claim 1 wherein the dissolved oxygen content of said mixed liquor is maintained at 0.5 mg. per liter thereof until said sludge is separated therefrom to provide said substantially phosphate-free effluent.

4. The process of claim 1 wherein said mixed liquor is aerated until the dissolved oxygen content of said mixed liquor is at least about 0.3 mg. per liter of said mixed liquor.

5. The process of claim 1 wherein oxygen is introduced into said mixed liquor until the dissolved oxygen content of said mixed liquor is at least about 0.3 mg. per liter of said mixed liquor and thereafter aerating said mixed liquor to maintain dissolved oxygen content of said mixed liquor of at least about 0.3 mg. per liter of said mixed liquor until said sludge is separated therefrom to provide said substantially phosphate-free effluent.

6. The process of claim 1 wherein said separated sludge having a reduced phosphate content (E) is aerated and the pH thereof adjusted to form about 7 to about 8.5, before recycling (F) to provide sludge for mixing with said influent sewage material.

7. The process of claim 1 wherein a phosphate insolublizing reagent is added to said separated phosphate-enriched supernatant liquor (E) to precipitate said phosphate and thereafter separating and recovering said precipitate.

8. The process of claim 1 wherein said sludge separated from said mixed liquor in maintained under anaerobic conditions and at a pH less than 6.5, to reduce the phosphate content of said separated sludge and to provide a phosphate-enriched supernatant liquor.

9. The process of claim 8 wherein the sludge separated from said mixed liquor is maintained under anaerobic conditions and at a pH of from about 5.0 to about 6.0.

References Cited by the Examiner

UNITED STATES PATENTS 2,337,384  1943  Gould _____ 210—7

(Other references on following page)

OTHER REFERENCES

Babbit: Sewerage and Sewage Treatment, Sixth ed., 1947, John Wiley, N.Y., pp. 454–456, 534 and 535 relied on.

Feng: Phosphorous and The Activated Sludge Process, Water and Sewage Works, vol. 109, November 1962 pp. 431–434.

Keefer et al.: Activated Sludge Studies, III. Effect of pH etc., Sewage and Ind. Wastes, vol. 23, August 1951, pp. 982–991.

Lea et al.: Removal of Phosphates From Treated Sewage, Sew. & Ind. Wastes, vol. 26, March 1954, pp. 261–275.

MORRIS O. WOLK, *Primary Examiner.*

MICHAEL E. ROGERS, *Examiner.*

UNITED STATES PATENT OFFICE
CERTIFICATE OF CORRECTION

Patent No. 3,236,766  Dated February 22, 1966

Inventor(s) Gilbert V. Levin

It is certified that error appears in the above-identified patent and that said Letters Patent are hereby corrected as shown below:

Column 6, line 18, "3.0" should read --0.3--.

Signed and sealed this 23rd day of April 1974.

(SEAL)
Attest:

EDWARD M. FLETCHER, JR.
Attesting Officer

C. MARSHALL DANN
Commissioner of Patents